United States Patent
Toennessen et al.

(10) Patent No.: US 7,658,161 B2
(45) Date of Patent: Feb. 9, 2010

(54) SYSTEM FOR DEPTH CONTROL OF A MARINE DEFLECTOR

(75) Inventors: Rune Toennessen, Oslo (NO); Emmanuel Keskes, Nantes (FR); Eskild Storteig, Lierskogen (NO); Per Helgerud, Hokksund (NO); Vahid Moosavi, Stabekk (NO); Philippe Saint-Pere, Castelnau de Medoc (FR)

(73) Assignee: WesternGeco L.L.C., Houston, TX (US)

( * ) Notice: Subject to any disclaimer, the term of this patent is extended or adjusted under 35 U.S.C. 154(b) by 30 days.

(21) Appl. No.: 10/550,703

(22) PCT Filed: Mar. 26, 2004
(Under 37 CFR 1.47)

(86) PCT No.: PCT/EP2004/050379
§ 371 (c)(1),
(2), (4) Date: Apr. 16, 2007

(87) PCT Pub. No.: WO2004/086092
PCT Pub. Date: Oct. 7, 2004

(65) Prior Publication Data
US 2008/0022913 A1    Jan. 31, 2008

(30) Foreign Application Priority Data
Mar. 27, 2003 (GB) .................. 0307018.2

(51) Int. Cl.
*B63H 25/00* (2006.01)
(52) U.S. Cl. ................................ 114/246
(58) Field of Classification Search .......... 114/245, 114/246
See application file for complete search history.

(56) References Cited

U.S. PATENT DOCUMENTS

| 2,980,052 | A |   | 4/1961  | Fehlner |
|-----------|---|---|---------|---------|
| 3,921,562 | A | * | 11/1975 | Kelly ............................ 114/245 |
| 4,574,723 | A |   | 3/1986  | Chiles et al. |
| 4,991,534 | A |   | 2/1991  | Warnan et al. |
| 5,357,892 | A | * | 10/1994 | Vatne et al. .................. 114/244 |

(Continued)

FOREIGN PATENT DOCUMENTS

BE              497 522 A       12/1950

(Continued)

OTHER PUBLICATIONS

International Search Report dated Sep. 21, 2004, for Application No. PCT/EP2004/050379.

(Continued)

*Primary Examiner*—Stephen Avila
(74) *Attorney, Agent, or Firm*—Ari Pramudji; Richard V. Wells; Kevin McEnaney (57) ABSTRACT

A system for adjusting a deflector in a seismic survey comprises a generally upright deflector body and at least one bridle connected to a seismic cable. The bridle includes an upper segment secured to an upper connection point on the deflector body, and a lower segment coupled to a lower connection point on the deflector body. The upper bridle segment, lower bridle segment and deflector body define a geometry between themselves. This geometry is adjustable by at least one actuator so as to control the tilt angle of the deflector body.

57 Claims, 9 Drawing Sheets

U.S. PATENT DOCUMENTS 6,028,817 A * 2/2000 Ambs ........................ 367/16
6,598,554 B1 * 7/2003 Lasky et al. ................ 114/245

FOREIGN PATENT DOCUMENTS

| DE | 976 740 C | 4/1964 |
| EP | 0 168 959 A1 | 1/1986 |
| GB | 2 122 562 A | 1/1984 |
| WO | WO 00/76839 A1 | 12/2000 |
| WO | WO 02/47966 A2 | 6/2002 |
| WO | WO 02/47968 A1 | 6/2002 |

OTHER PUBLICATIONS

UK Search Report dated May 22, 2003, for Application No. GB 0307018.2.

* cited by examiner

FIG. 10

SYSTEM FOR DEPTH CONTROL OF A MARINE DEFLECTOR

BACKGROUND OF THE INVENTION

1. Field of the Invention

The present invention relates to a system for controlling the depth of a seismic deflector under tow through the water.

2. Background of the Related Art

The ability to conduct accurate seismic surveys may help improve the discovery rates and even the production of subsurface accumulations, such as hydrocarbons. Seismic surveying is a method of stimulating a geological subsurface formation with, e.g., electrical, magnetic, and/or acoustic signals to acquire seismic data about the formation. From this data, one can predict whether the formation contains hydrocarbon deposits and, if so, where those hydrocarbon deposits are located.

One type of seismic survey is generally referred to as a "marine" survey, because it is typically conducted at sea, although this is not necessarily always the case. During marine seismic surveys, seismic cable systems are deployed in the water behind a towing vessel.

Deflector devices, also known as deflector systems (collectively "deflector(s)" herein), are used between a towing vessel and a streamer located in water, in order to pull the streamer out to one side of the vessel. Control of the deflector allows the streamer to be positioned at a desired lateral offset from the course followed by the vessel. Seismic surveys are generally carried out with a number of streamers towed in substantially parallel paths behind a vessel.

Figure 1:
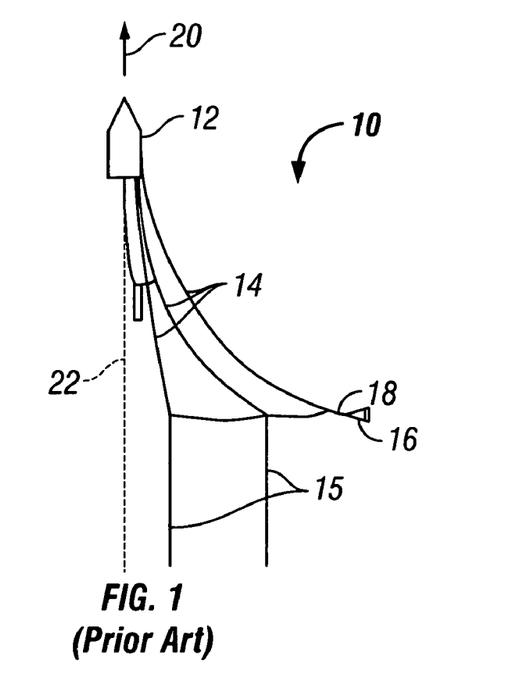
FIG. 1 is an aerial view of towed streamers using a door type deflector.

For example, FIG. 1 is an aerial view of a typical towed streamer array using a door type deflector. The system 10 includes a vessel 12 for pulling lead-ins 14 and streamers 15 through the water. A door deflector 16 is coupled by cables or "ropes" 18 to the streamers 15 or lead-ins 14. As the deflector 16 is towed through the water in the direction of tow indicated by the arrow 20, the force of the water against the surfaces of the deflector 16 allows the deflector to pull the streamers 15 out laterally to the side of the vessel 12. This allows the streamers 15 to be appropriately spaced over a larger survey area. Typically, the streamer array is symmetrical about the central axis 22 that extends directly behind the vessel.

Figure 2:
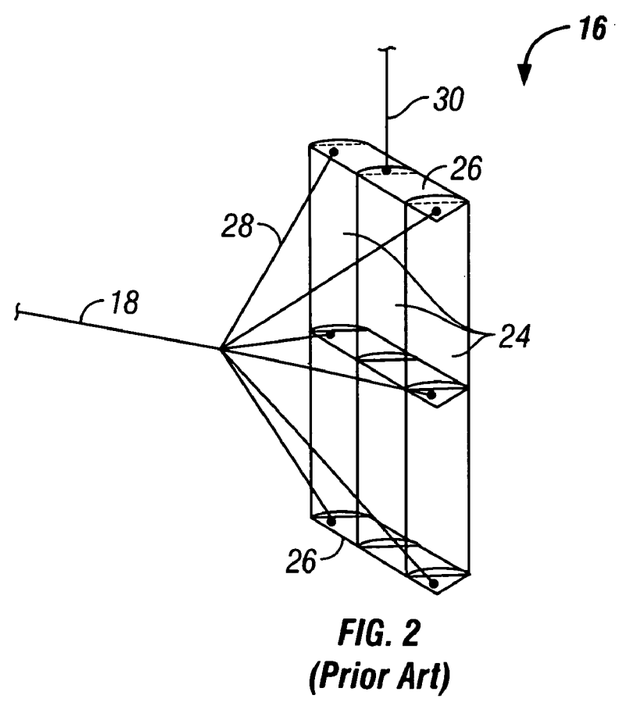
FIG. 2 is a perspective view of a door deflector as shown in FIG. 1.

FIG. 2 is a perspective view of a door deflector as shown in FIG. 1. The door deflector 16 is a traditional seismic deflector, also referred to as a vane, bi-vane, Baro-door, Baro vane, or paravane. The door deflector 16 comprises of a number of parallel vertical wings 24 mounted along side each other in a frame 26 that typically forms a rectangle. The door deflector 16 is normally towed with up to six bridle chains 28, including one chain 28 from each corner of the rectangular door and often two extra chains 28 in the middle. The deflector 16 is completely submerged and positioned generally vertically in the water by suspending the deflector by a chain 30 coupled a surface float (not shown).

Figure 3:
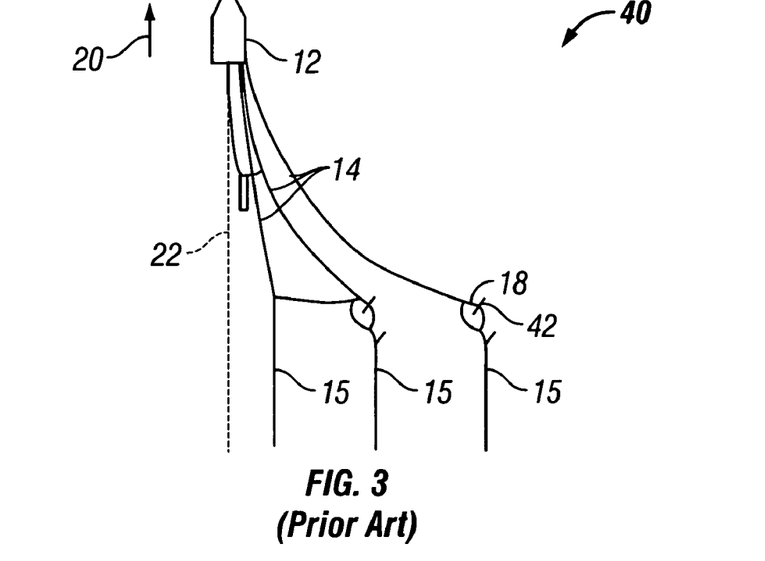
FIG. 3 is an aerial view of towed streamers using a wing type deflector.

FIG. 3 is an aerial view of towed streamers using a wing type deflector. The system 40 includes a vessel 12 for pulling lead-ins 14 and streamers 15 through the water. A wing deflector 42 is coupled between the lead-ins 14 and the streamers 14 and towed through the water in the direction of tow indicated by the arrow 20. The force of the water against the deflector 42 allows the deflector to pull the streamers 14 out laterally to the side of the vessel 12 into an appropriate spacing for a survey. Typically, the streamer array is symmetrical about the central axis 22 that extends directly behind the vessel.

Figure 4:
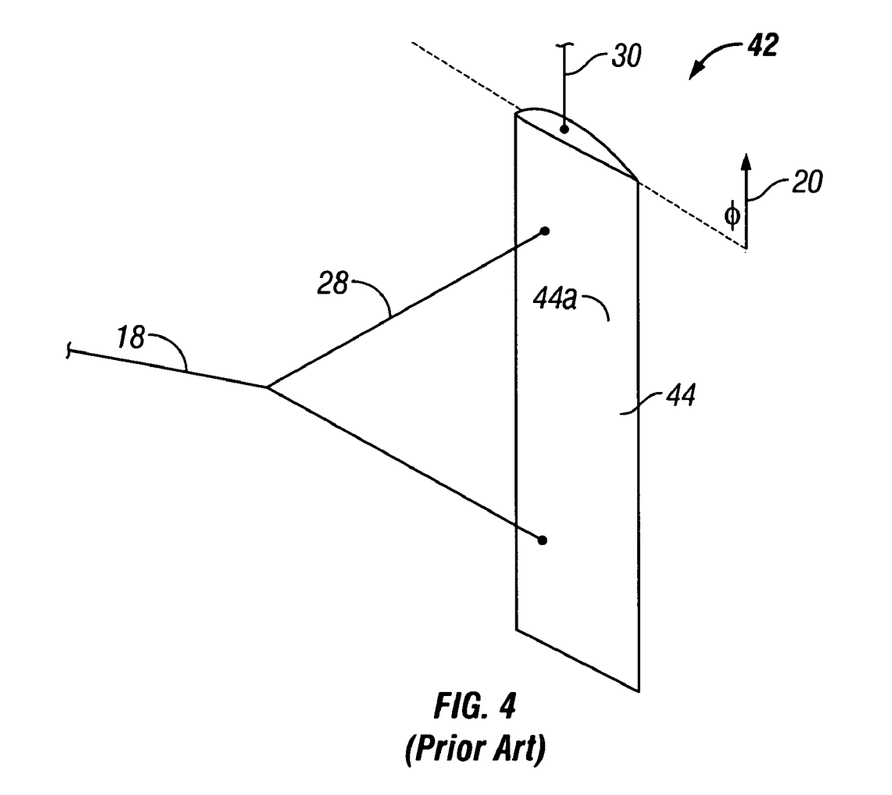
FIG. 4 is a perspective view of a wing deflector as shown in FIG. 3.

FIG. 4 is a perspective view of a wing deflector as shown in FIG. 3. In use, the wing deflector 42 has a wing-shaped body 44 suspended by a chain or a rope 30 beneath a float (not shown) so as to be completely submerged and positioned generally vertically in the water. As the deflector device is pulled through the water, the wing-shaped body produces a sideways force, or "lift", which moves the deflector laterally relative to the direction of tow. It is useful to define an "angle of attack" when discussing such lift, this angle being defined by the arc between the plane in which the trailing surface of the deflector body lies and the direction of tow through the water. The angle of attack will lie generally in a horizontal plane, although not necessarily so. Thus, in FIG. 4, the angle of attack is indicated as angle f between trailing deflector body surface 44a and direction of tow 20.

An exemplary wing deflector is described in detail in U.S. Pat. No. 5,357,892, which patent is incorporated by reference herein, and comprises a wing-shaped deflector body having a remotely-operable pivotal lever or "boom" which extends rearwardly from a point near the middle of the trailing edge of the wing-shaped body. The lift produced by the deflector can be varied by adjusting the angle of the boom from the vessel, thus permitting the lateral offset of the tow from the course of the vessel to be varied in use. The deflector device of U.S. Pat. No. 5,357,892 has been successfully commercialized by the Applicant as its MONOWING™ deflector device. In use, rolling stability of the device is provided by the connection to the float, while stability of the device about a vertical axis is provided by the drag produced by the tow.

A different version of the MONOWING exists where the angle of attack is controlled by other means than regulating the angle of the boom as described above and which relates to U.S. Pat. No. 5,357,892. In this system, a relatively long boom is rigidly fixed to the suction side of the wing and pointing rearwardly from the wing. In the rear end of this boom are mounted so called boom-wings that are adjustable in angle of attack and hence lift. By means of adjusting the lift of the boom-wing, new equilibrium positions in the so called yaw angle (rotation about the vertical axis) are found and the lift of the main wing is modified.

The MONOWING deflector devices in current use are very large, typically 7.5 m high by 2.5 m wide, and weigh several tons. They are usually suspended around 2 m to 8 m below the float by means such as a fiber rope, and are also provided with a safety chain intended to prevent separation of the float and wing-shaped body in the event that the rope breaks. In rough weather, the upper part of the wing-shaped body may rise up out of the water, allowing the rope connecting the wing-shaped body and the float to go slack. If the wing-shaped body then drops abruptly, the rope, and possibly even the safety chain, may break, and/or their attachment points on the wing-shaped body may be badly damaged.

The depth at which the current deflector devices operate is effectively determined by the length of the rope connecting the deflector to the float. As a result of this, the operating depth of the deflector device cannot readily be varied while the device is deployed in the water. And since the normal operating depth of the current deflector device is typically a few meters, in the event of the onset of bad weather during a survey, the device and all the streamers and other equipment directly or indirectly attached to it have to be recovered onto the towing vessel, and then re-deployed when the bad weather has passed, both of which operations are very time consuming.

Therefore, there is a need for a deflector that can be controlled to a given depth. It would be desirable if the depth were controllable on a continuous basis. It would be further desirable if the deflector was not directly affected by wave actions. It would be even more desirable if depth control could be used with existing deflector designs, including both door and wing deflectors.

SUMMARY OF THE INVENTION

The present invention provides a seismic survey system comprising a generally upright deflector body and an adjustable bridle coupled to the deflector body, wherein the adjustable bridle includes a connector for coupling the bridle to a cable, such as a lead-in, and wherein the adjustable bridle is capable of varying the tilt angle of the deflector body. The depth of the deflector body is controlled by varying the tilt angle of the deflector body being towed in water by a lead-in cable drawn behind a vessel. Preferably, the tilt angle is varied by pivoting the deflector about an axis that is generally transverse to the cable. The deflector may be pivoted through a number of mechanisms that alter the bridle geometry, such as by changing the length of one or more bridle segments or changing one or more angles between the bridle segments and/or the deflector body.

The deflector body may be of any known or later developed design, such as a wing deflector or a deflector door. Unlike existing deflectors, a preferred embodiment of the deflector is not suspended from a separate flotation device. Optionally, the deflector body may include a buoyancy element, preferably such that an upper end of the deflector has more buoyancy that the lower end of the deflector. In one embodiment, the deflector comprises a weight element in a lower end of the main body and a buoyancy element in an upper end of the main body. It is most preferable to make the deflector only slightly negatively buoyant.

The adjustable bridle is responsible for varying the tilt angle of the deflector body. In a preferred embodiment, the bridle has an upper segment coupled to an upper connection point on the deflector body and a lower segment coupled to a lower connection point on the deflector body. The segments of the bridle may be made from rigid members, flexible members, or a combination thereof. Nonlimiting examples of rigid members includes rods, beams and actuated cylinders, and nonlimiting examples of flexible members includes ropes, chains and cables. In one embodiment, the tilt angle of the deflector is adjusted by changing the length of the upper segment(s) of the bridle relative to the length of the lower segment(s) of the bridle. In another embodiment, the tilt angle of the deflector is adjusted by changing an angle between upper and lower bridle segments or between a bridle segment and the deflector body. The latter change in angle between a bridle segment and the deflector body may be accomplished by moving the connection-point of the bridle segment to the deflector body upward or downward.

At any point in time, the bridle is connected to the deflector in a manner defining a geometry therebetween that established the tilt angle of the deflector relative to the cable. The bridle geometry is made adjustable by including an actuator means or motor means that can controllably adjust a connection-point or effective length of one or more segments of the bridle. The term "connection point", as used herein, means the point along the length of the deflector where the bridle segment connects with the deflector body. The term "effective length", as used herein, means the distance between the real or imaginary point where the bridle segments converge and the real or imaginary point where the bridle segment is secured to the deflector body. Preferably, upper and lower segments of the bridle are connected to the body of a wing deflector on a line extending parallel to the longitudinal axis of the deflector body. Preferably, upper and lower segments of the bridle are connected to the body of a door type deflector along multiple lines extending parallel to the longitudinal axis of the deflector body.

The deflector or deflector system may further include a controller for adjusting the tilt angle. The controller may be of any type, such as digital, analog or a combination thereof, and may be located with the deflector, with the vessel, or constitute distributed control with different steps or actions taking place in different locations yet collectively serving as a controller. Where a controller is located within the deflector for controlling the tilt angle or depth of the deflector, the system will preferably further comprise a remote controller, such as on the vessel, for providing a tilt angle or depth setpoint to the local controller. In one embodiment, the deflector or deflector system comprises a sensor for measuring the actual depth of the deflector, an actuator for adjusting the bridle, and a controller for providing a command to the actuator upon input from the sensor to achieve or maintain a desired depth of the deflector.

In a preferred embodiment, the controller causes the actuator to vary the angle between the deflector and the cable so that the vertical component of lift from the deflector is substantially equal to the vertical component of gravity (adjusted for buoyancy) minus the vertical component of tension in the cable.

In a particularly preferred embodiment, the deflector may additionally include means for controlling the cross-line position of the deflector. For example, the deflector may include an adjustable lever pivotally connected by a first pivotal connection to the deflector body adjacent the rear edge of the deflector body and extending rearwardly thereof, and an attachment point on the rear end of the adjustable lever for connecting a rearwardly extending cable. Typically, the adjustable lever includes an actuator for adjusting the position of the attachment point with respect to the deflector body. Specifically, the adjustable lever may comprise a second pivotal connection on the adjustable lever, and an adjustable mechanism mounted on the deflector body and operatively connected to the second pivotal connection for adjusting the rear end of the adjustable lever by pivoting the second pivotal connection about the first pivotal connection between the adjustable lever and the deflector body. The adjustable mechanism adjusts the angle of the adjustable lever with respect to the deflector body. In a practical seismic survey system, the system will include a seismic cable link between forwardly and rearwardly extending cables for bypassing the deflector body. Those skilled in the art will understand that "forward" or "forwardly" in this specification means the direction from the center of the deflector generally towards the towing vessel during operation and that "rear" or "rearwardly" in this specification means the direction from the center of the deflector generally away from the towing vessel during operation. The system will also include power means operatively connected between the deflector body and the adjustable mechanism for operating the adjustable mechanism. A controller is also typically included for controlling the adjustable mechanism.

In one embodiment, the deflector with an adjustable bridle is used in combination with a pivot float attached at a position on the cable, such as the lead-in, that is forward of the deflector body. Accordingly, the pivot float serves as a pivot point from which the deflector pivots when the deflector depth is adjusted. Generally speaking, by adjusting the tilt angle of the deflector, the deflector can be made to move in an arc about the pivot point defined by the pivot float in order to achieve a given depth.

In another embodiment, a deflector comprises a deflector body, perhaps selected from a wing deflector and a deflector door, a connector coupling the deflector body to a cable being towed in water behind a vessel, a first actuator for varying the angle of attack of the deflector body, and a second actuator for varying the tilt angle of the deflector body, wherein the first and second actuators are operated independently. This deflector is characterized in that the depth of the deflector body is controlled by varying the tilt angle of the deflector body. The tilt angle is varied by pivoting the deflector body about an axis that is generally transverse to the cable. Optionally, the second actuator is coupled to a first controllably movable flap to one side of the deflector center of lift.

In yet another embodiment of the invention, a deflector comprises a generally upright deflector body including at least one connection point for coupling to at least one cable, and at least one controllably movable flap coupled to the deflector body to vary the tilt angle of the deflector body.

The invention also includes a method for controlling the depth of a deflector under tow. The method comprises varying the tilt angle between the deflector and cable, wherein a change in the tilt angle causes the deflector to change depth, and wherein the tilt angle is varied about an axis that is generally transverse to the cable. Preferably, the method includes controlling the tilt angle to change the depth, such as by changing the length of one or more bridle segments or changing one or more angles between the bridle segments and/or the deflector body. Alternatively, the method may include controllably adjusting the angle of flaps on upper and lower segments of the deflector to varying the tilt angle of the deflector. In this instance, the tilt angle may be adjusted by using flexible bridle members and permitting one or more of the members to go slack while other members remain in tension A preferred method includes measuring the depth of the deflector, and providing a command for the deflector to achieve a different depth or maintain the same depth. It should be recognized that changing ocean current or wave conditions, as well as changing tow speed, may require continuous adjustments in the tilt angle in order to even maintain a depth already achieved. In one embodiment, the method includes coupling a float to the cable upstream of the deflector, wherein a change in the tilt angle causes the deflector to pivot about the float.

DETAILED DESCRIPTION OF A PREFERRED EMBODIMENT

The present invention provides a marine deflector for a seismic survey system. The deflector has a generally upright deflector body that controllably tilts about an axis that is generally transverse to a cable that pulls the deflector through the water. In one embodiment, an adjustable bridle is coupled to the deflector body, wherein the adjustable bridle includes a connector for coupling the bridle to the cable, such as a lead-in, and wherein the adjustable bridle is capable of varying the tilt angle of the deflector body. The depth of the deflector body is controlled by varying the tilt angle of the deflector body. Preferably, the tilt angle is varied by pivoting the deflector relative to an axis that is generally transverse to the cable.

The deflector may comprise a so called wing deflector, e.g. the WesternGeco Monowing, or it may comprise a so called deflector door, frequently called a door or a Barovane comprising a series of hydrofoils mounted within a rectangular frame. Regardless of the type of deflector, the present invention allows for the tilt angle of the deflector to be adjusted by one or more of a variety of methods or means. One embodiment includes adjusting wing flaps as known from airplanes. The flaps re-distribute the lift of the wing along the span so as to create a moment of force that results in a tilt angle. A second embodiment includes manipulating the geometry defined by the deflector body and the towing bridle segments. Finally one may also imagine a combination of bridle adjustment and flap adjustment.

The preferred method of using the deflector involves controlling the tilt angle, also called heel angle or roll angle, of the deflector in such a way that the vertical component of the lift force generated by the wing changes with the tilt. The wing will find its equilibrium in depth when the vertical component of the wing lift plus the vertical component of the gravity force equals the vertical component of the tension in the tow wire or lead-in. By changing the tilt angle, the wing will find a new equilibrium depth.

Unlike deflectors currently on the market, the present depth controllable deflectors should be close to zero buoyant. Preferably, the deflectors should be slightly negative buoyant in order for changes in water speed to have minimal influence on the depth of the deflector. Furthermore, since a near-zero buoyant deflector does not require a direct connection to a surface float, i.e., a hanging support connection, the typical strains on the direct cable connection due to wave loads on the surface float are eliminated. Therefore, maintenance intervals may be increased and the risk for catastrophic failures of this cable connection is eliminated.

The invention provides the ability to effectively control the depth of the deflector while the deflector is deployed. Controlling the depth of the deflector means that you can control the depth of the streamer near the connection to the deflector. For example, the front end of the streamer may be controlled at a fixed or changing depth. One advantageous application for controlling the depth includes lowering the front end of a streamer during periods of strong waves in order to reach a depth where the wave action is insignificant. It should be noted that wave action decays exponentially with depth. Consequently, the seismic vessel can leave the equipment out in the water through much worse wave conditions with little or no damage. This also reduces the number of retrievals and deployments and opportunities for equipment damage and personnel injuries that can occur during retrievals and deployments. Productivity is increased because the system is quickly ready for production when the waves calm down simply by returning the streamer to the desired operating depth. Furthermore, depth control of the deflector and the front end of the streamer can have a positive effect on the seismic data quality, since the front end may be operated at the same depth as the desired streamer depth resulting in less noise on the front sections of the streamer.

Figure 5:
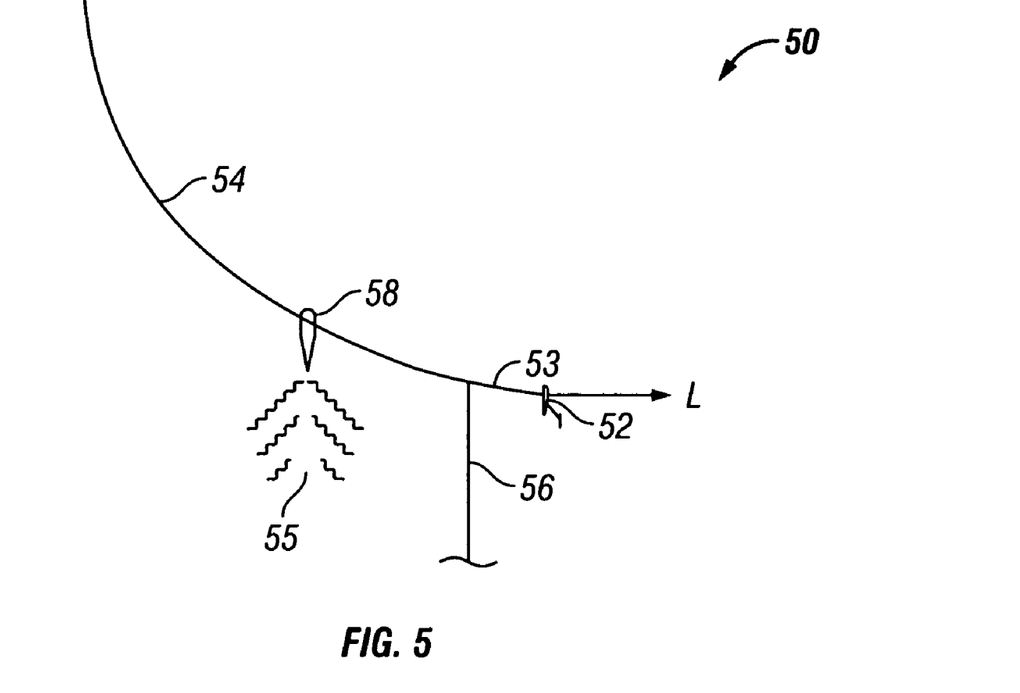
FIG. 5 is an aerial view of a deflector under tow.

FIG. 5 is an aerial view of an exemplary configuration of a seismic survey system 50 having a deflector 52 in accordance with the present invention. The deflector 52 is coupled by a bridle 53 to a lead-in cable 54 that is pulled through the water 55 behind a vessel (not shown). The lead-in cable 54 is on the upstream end of the seismic cable from the deflector and is shown including an optional pivot float 58. A streamer 56 is attached to the lead-in cable 54, but could also be coupled directly to the deflector 52. The streamer 56 is preferably coupled as close to the deflector 52 as possible for effective depth control of the front end of the streamer 56. The deflector 52 should be generally upright during operation, since a large tilt angle will reduce the horizontal lift force on the deflector that is needed to achieve the desired separation of multiple streamers in an array. In addition, it is beneficial for the bridle 53 to be as perpendicular to the deflector as possible. The latter two characteristics of the system are achievable when the deflector is balanced so that it is slightly heavier than water when submerged in water. In this case, a change in lift force by e.g. change in water speed and/or change in angle of attack will have as little impact on the depth of the wing as possible.

Figure 6A:
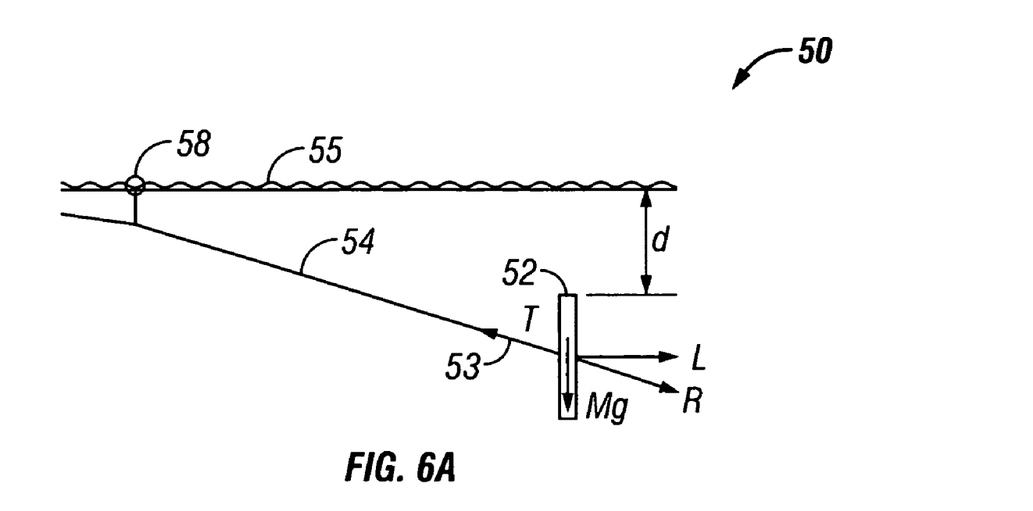
FIGS. 6A through 6C are schematic diagrams of the deflector system as viewed from behind the deflector looking in the direction of tow.
Figure 6B:
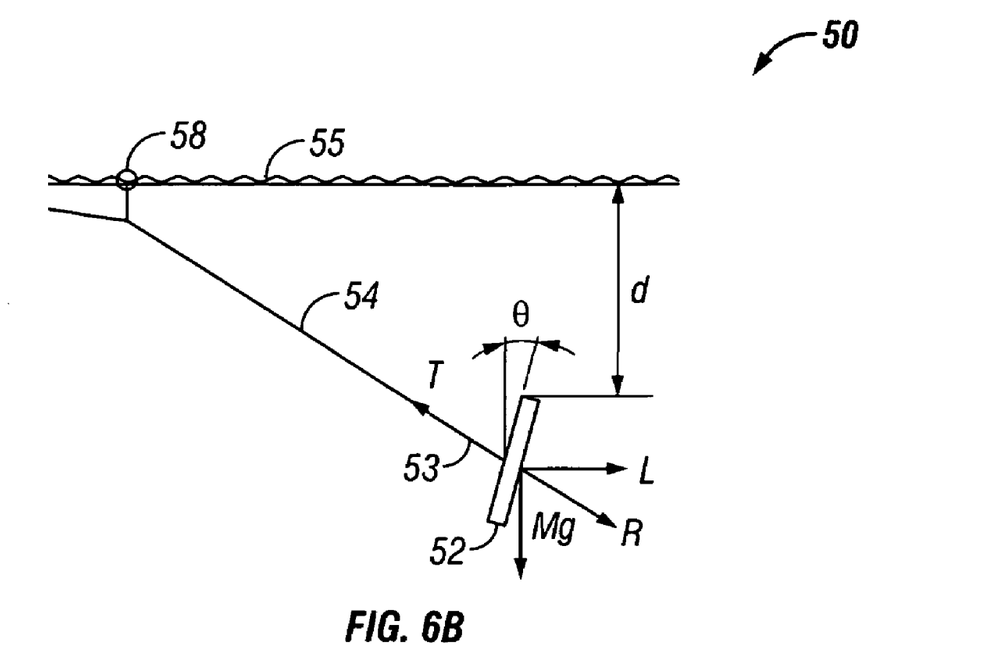
Figure 6C:
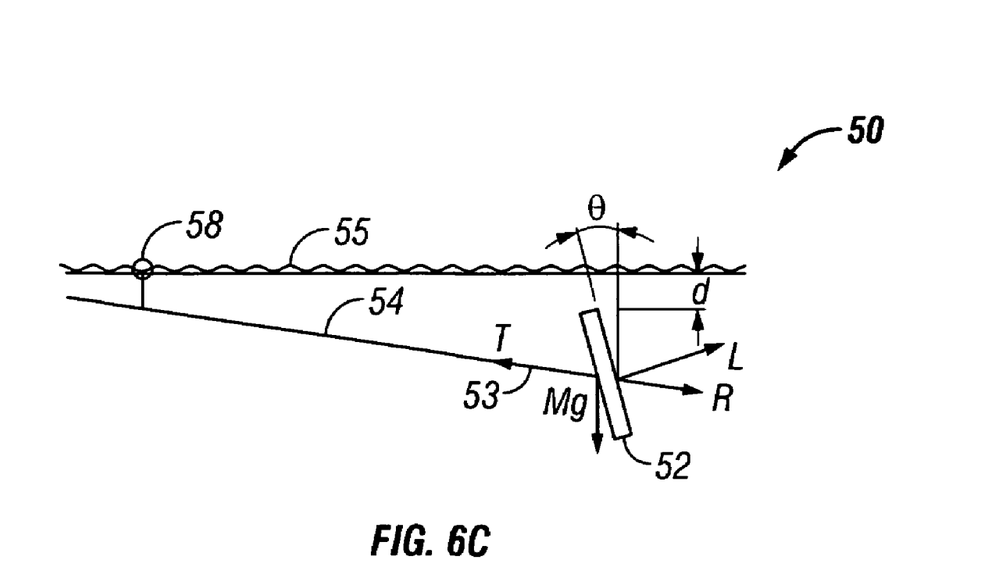

FIGS. 6A-6C are schematic diagrams of the system 50 as viewed from behind the deflector 52 looking in the direction of tow. The deflector is viewed from below the surface of the water 55 and from a downstream location. The diagrams illustrate the force equilibrium on the deflector 52 that is used to control the deflector depth, d. The lead-in (tow cable) 54 and bridle 53 are shown coming in from the left and being attached to the deflector 52. The lead-in 54 is coupled to the optional surface float or pivot float 58 that establishes a local pivot point from which the outer part of the lead-in 54, the bridle 53 and the deflector 52 are pivoted when depth is adjusted. The deflector 52 remains in an equilibrium position as long as the resultant force, R, between the lift force, L, and the gravity force (i.e., weight) resulting from the application of gravity on the deflector mass, Mg, is in-line with the lead-in tension force, T. It is useful to define a "tilt angle" for this discussion this angle being defined by the arc between the plane in which the trailing surface of the deflector 52 lies and the gravity vector (i.e., vertical). The tilt angle will lie generally in a vertical plane, and is indicated as angle θ in FIGS. 6B-6C. Changing the tilt angle, θ, of the deflector will result in a change in direction of the resultant force, R, such that the whole system from the pivot buoy or float 58 to the deflector will rotate about the pivot float 58 until a new equilibrium position or depth is established.

Figure 7A:
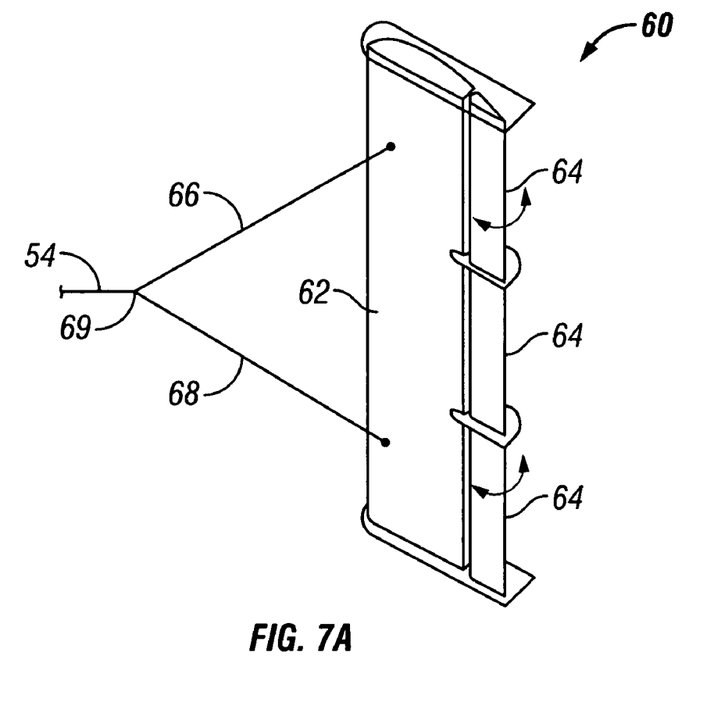
FIGS. 7A and 7B are perspective views of a deflector having adjustable flaps in accordance with a second embodiment of the invention.

FIG. 7A is a perspective view of a deflector wing 60 having a deflector body 62 and adjustable flaps 64 in accordance with one embodiment of the invention. Rotating the upper and lower flaps 64 in opposite directions or in the same direction to different degrees, i.e., independently, will create a hydrodynamic tilt-moment that will make the wing 60 tilt. Alternatively, a tilt-moment can be created by rotating a single flap 64 without movement of the other flap(s) 64. The deflector 60 may have any number of flaps, even a single flap, so long as one or more of the flaps can produce a tilt-moment. The deflector 60 is shown in FIG. 7A coupled to a bridle having an upper segment 66 and a lower segment 68 converging and coupling to the lead-in cable 54 at a point 69. In this instance, the tilt angle is adjusted by using flexible bridle segments 66, 68 and permitting one of the segments to go slack while the other segment remains in tension.

Figure 7B:
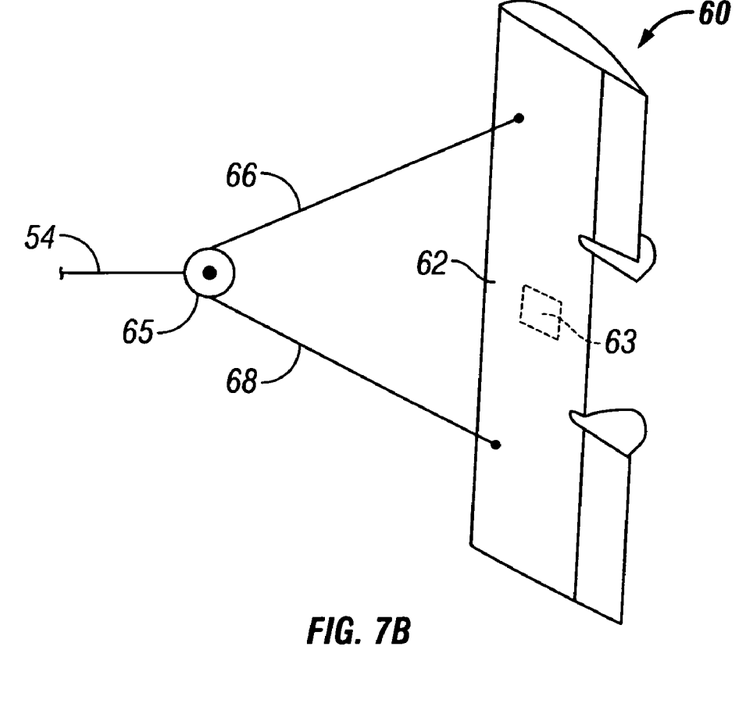

An alternative design is shown in FIG. 7B. The bridle including segments 66 and 68 shown in FIG. 7B are coupled to each other to form a single cable that is in engaged with a pulley 65 secured to the end of cable 54. In this manner, the desired tilt angle can be achieved with a lower magnitude of the tilt-moment. The deflector embodiment of FIG. 7B also includes a sensor 63 for measuring the actual depth of the deflector. This sensor will cooperate with an actuator (not shown) for adjusting the bridle, and a controller (not shown) that provides a command to the actuator upon input from the sensor to achieve or maintain a desired depth of the deflector. The actuator and controller are described further below with reference to FIGS. 9C and 9D.

Figure 8A:
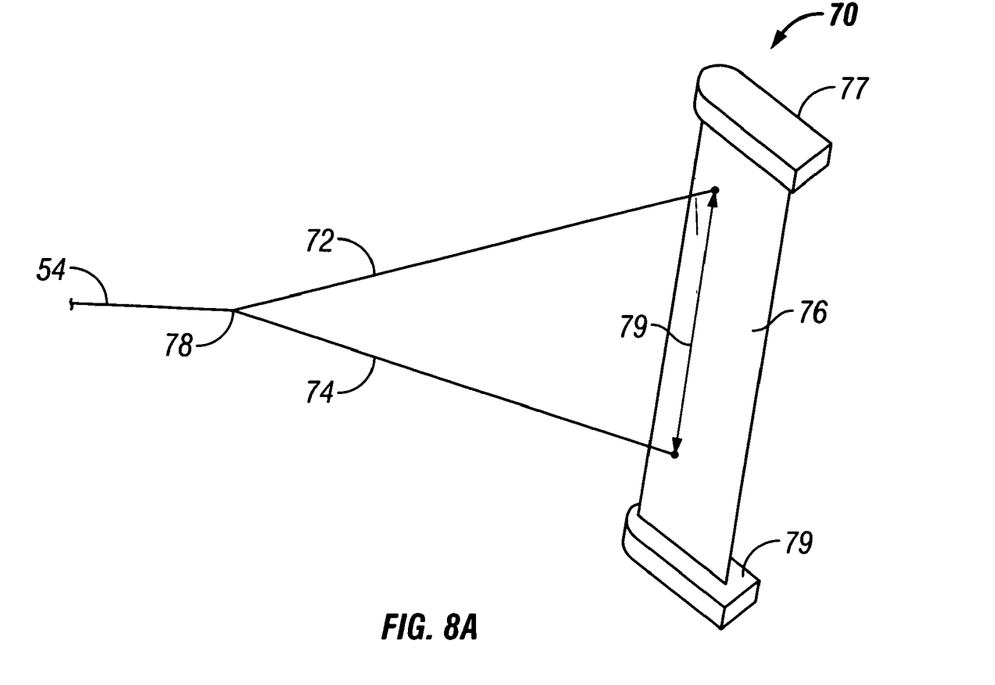
FIGS. 8A and 8B are a perspective views of a bridle coupled to a wing deflector and deflector door, respectively.

FIG. 8A is a perspective view of a wing deflector 70 with a bridle formed by chain segments 72 and 74 extending from the deflector body 76 to a connection point 78. A controller and actuator (not shown) can manipulate the geometry bound by the deflector and the bridles. This geometry comprises the triangle that is bound by bridle segment 72, bridle segment 74, and the deflector segment 79 extending therebetween. As with the embodiment of FIG. 7A, the tilt angle may be adjusted in the embodiment of FIG. 8A by using flexible bridle segments and permitting one of the segments to go slack while the other segment remains in tension.

In this particular embodiment, the deflector 70 is shown equipped at its upper end with an elongated, streamlined float 77 that is rigidly secured to the deflector body 76 so that the body depends downwardly from the float like the keel of a boat. The float may be constructed of a similar material to the body, e.g., titanium, but may otherwise be made from a fiber-reinforced composite material. A weight element 79 is also secured to deflector body 76, preferably to compensate the buoyancy force provided by float 77 to produce a slight negative buoyancy overall on deflector 70.

Figure 8B:
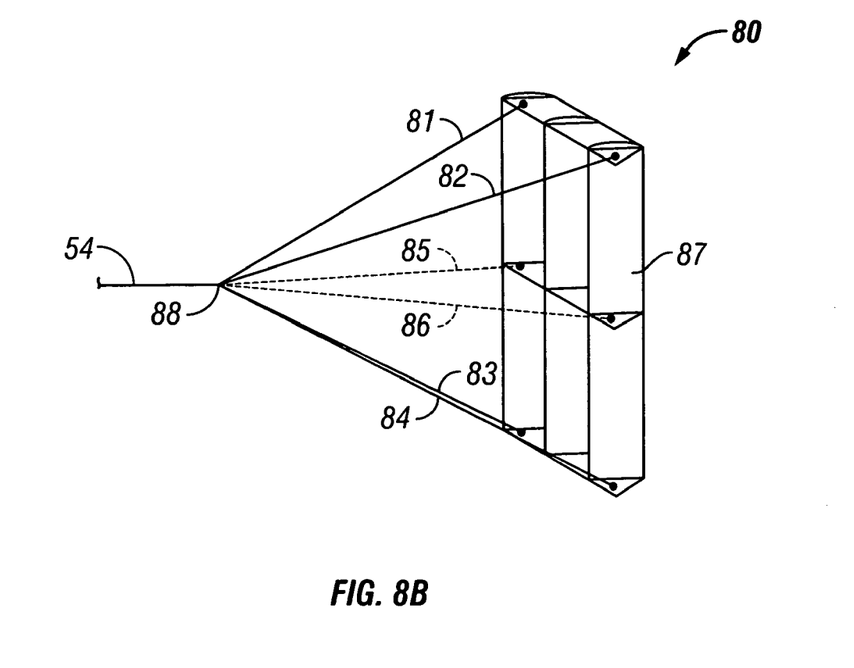

FIG. 8B is a perspective view of a deflector door 80 with a bridle formed by chain segments 81, 82, 83, 84 (and optionally, segments 85, 86) extending from the deflector body 87 to a connection point 88. For the door deflector 80, a controller and actuator (not shown) can manipulate the similar geometry as in FIG. 8A, except that the upper segments 81,82 must act as a pair and the lower segments 83,84 must act as a pair for depth control. Specifically for the purpose of changing the tilt angle of the door 87, the tetrahedral bound by the door 87 and the outer bridle members 81,82,83,84 are manipulated. The tilt angle of the deflector 87 is changed by altering the ratio of the length of the upper segments 81,82 to the length of the lower segments 83,84. However, it should be recognized that it is also possible, either sequentially or simultaneously with tilt angle adjustment, to adjust the angle of attack of the deflector 87 by altering the ratio of the length of the front segments 81,83,85 to the length of the trailing segments 82,84,86. When the tilt angle and angle of attack are both being controlled, the lengths of all bridle segments may be different at any point in time.

FIGS. 9A through 9G are schematic diagrams of a number of means for changing or manipulating the geometry bound by the bridles and the deflectors of the present invention. It should be recognized that the triangles shown in these Figures are side views that apply equally to either a wing deflector having two bridle chains 72,74 as in FIG. 8A or a deflector door having four bridle chains 81,82,83,84 as in FIG. 8B. In regard to a deflector door, the upper segment of the triangle in FIGS. 9A through 9G represents all upper segment chains, such as segments 81 and 82 of FIG. 8B, and the lower segment of the triangle represents all lower segment chains, such as segments 83 and 84 of FIG. 8B. The invention may be equally applied to bridles containing any number of segments.

Figure 9A:
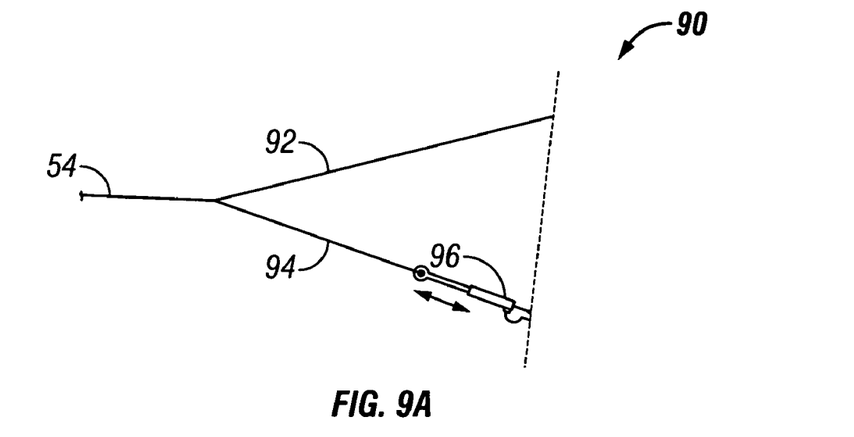
FIGS. 9A through 9G are schematic diagrams of a number of means for changing or manipulating the geometry bound by the bridles and the deflector.

FIG. 9A illustrates a simple system 90 where the length of the lower bridle segment 94 is adjusted by means of a hydraulic cylinder or actuator 96 overcoming the tension in the bridle.

Figure 9B:
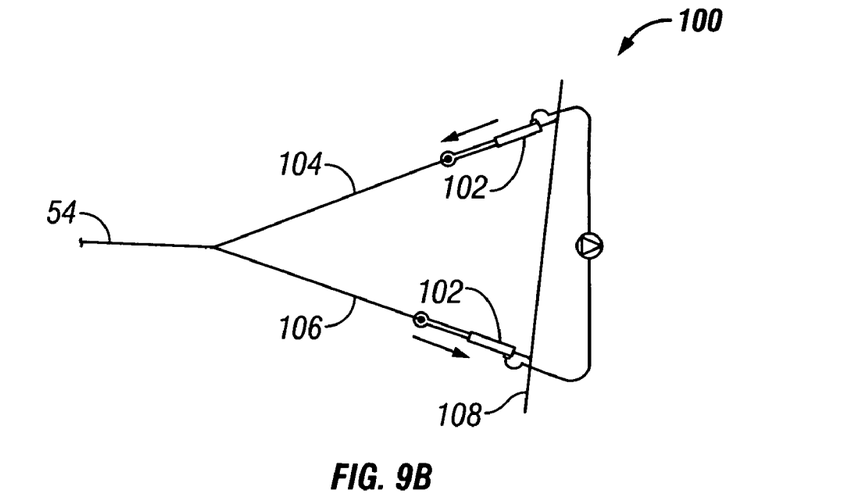

FIG. 9B shows a system 100 comprising a first hydraulic cylinder 102 coupled between an upper portion of the deflector 108 and the upper bridle segment 104, and a second hydraulic cylinder 102 coupled between a lower portion of the deflector 108 and the lower bridle segment 106. Both bridle segments 104, 106 are coupled at a connection point to the lead-in cable 54. This system is more energy efficient as the hydraulic pump only has to overcome the force equal to the tension difference in the bridle members and not the total tension as in the system of FIG. 9A. This is referred to as the principle of load-balancing.

Figure 9C:
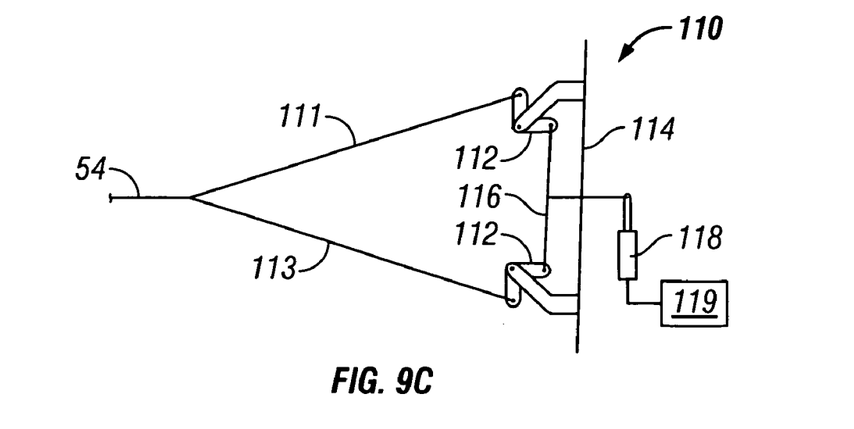
Figure 9D:
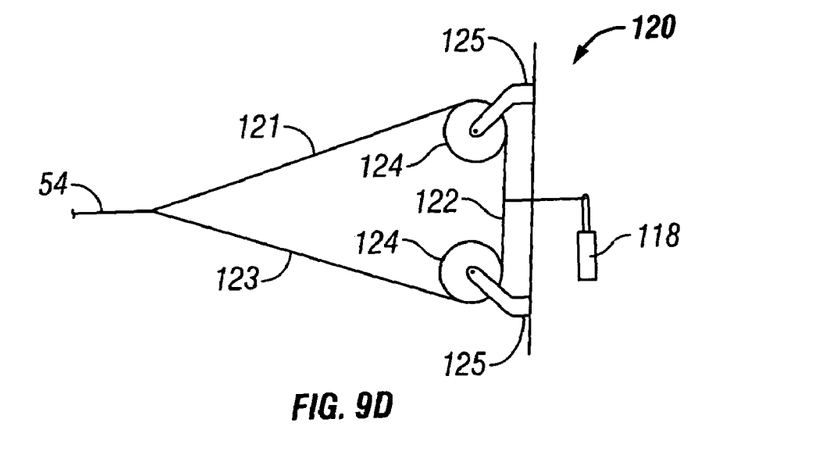

FIGS. 9C and 9D illustrate other systems that use the load balanced principle. In FIG. 9C, the system 110 includes rotatable connection points or towpoints 112 coupled to the deflector 114. The bridle segments 111,113 are attached to the outer lever arms, and between the inner lever arms are attached a rod, chain, or other connecting means 116 that transfer the loads between the two rotating towpoints 112. A linear actuator 118 is connected to this middle member 116 to control the rotation of the towpoints 112. In this embodiment of the invention, the deflector further includes a controller 119 for providing commands to the linear actuator. The controller may be of any type, such as digital, analog or a combination thereof, and may also be located on the vessel, or constitute part of a distributed control system with different steps or actions taking place in different locations yet collectively serving as a controller. Where the controller is locally positioned within the deflector, as depicted in FIG. 9C, for controlling the tilt angle or depth of the deflector, the system will preferably further comprise a remote controller (not shown), such as on the vessel, for providing a tilt angle or depth setpoint to the local controller.

FIG. 9D illustrates another system 120 that utilizes the same principle of load balancing, but the bridle segments 121,122,123 comprise a closed loop that forms a triangle extending around a block or wheel 124 at each towpoint 125. In the same manner as above, a linear actuator 118 adjusts the position of the bridle by being connected to the bridle segment 122 between the towpoints 125.

Figure 9E:
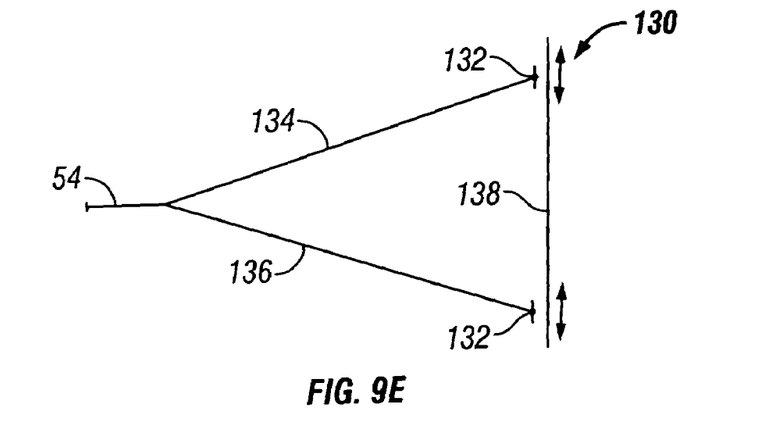

FIG. 9E illustrates a system 130 having sliding towpoints 132 that secure the ends of the upper bridle segment 134 and lower bridle segment 136 to the deflector body 138. Sliders as applied in modern sailing yachts may be used, as well as any actuator or motor. While it is optional to use only one sliding towpoint 132, the system would not be load balanced. Rather, it is preferred to use two sliding towpoints 132 that slide in the same operation so that the system will be load balanced.

Figure 9F:
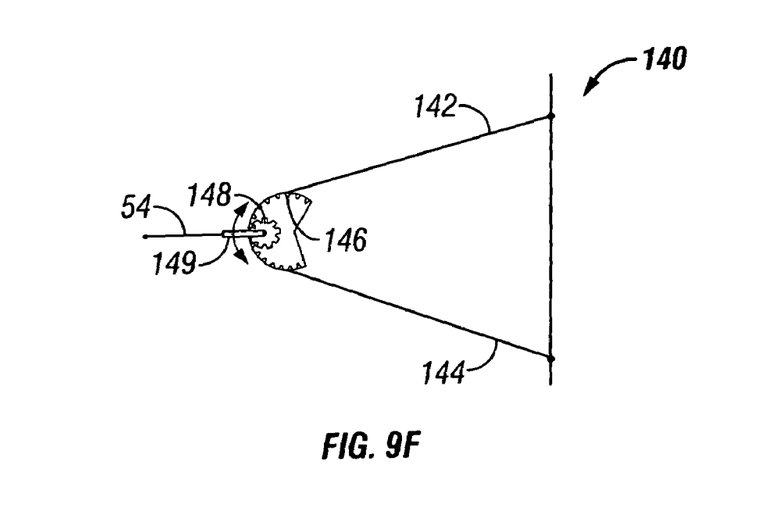

FIG. 9F shows a system 140 with the bridle segments 142,144 connected to an inverted toothed wheel 146 that is engaged with a toothed wheel 148 that is rotatably driven by an actuator 149. By adjusting this actuator 149 the attachment point where the lead-in 53 is attached to the inverted toothed wheel 146 is effectively adjusted, resulting in the tilting of the deflector.

Figure 9G:
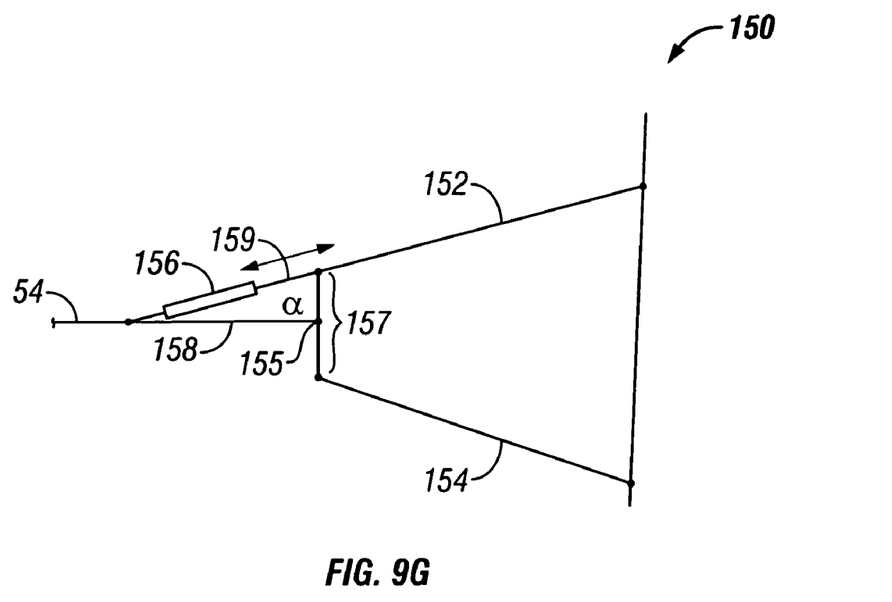

FIG. 9G illustrates a system 150 in which the angle, α, at which the lead-in 54 is connected to the bridle segments 152,154 is altered by an actuator or cylinder 156. A frame is formed at the outer end of the bridle and includes rigid members 157,158,159 that are pivotally connected. Energizing the actuator 156 applied a force on rigid member 159, which member then causes rotation of member 157 at point 155.

Figure 10:
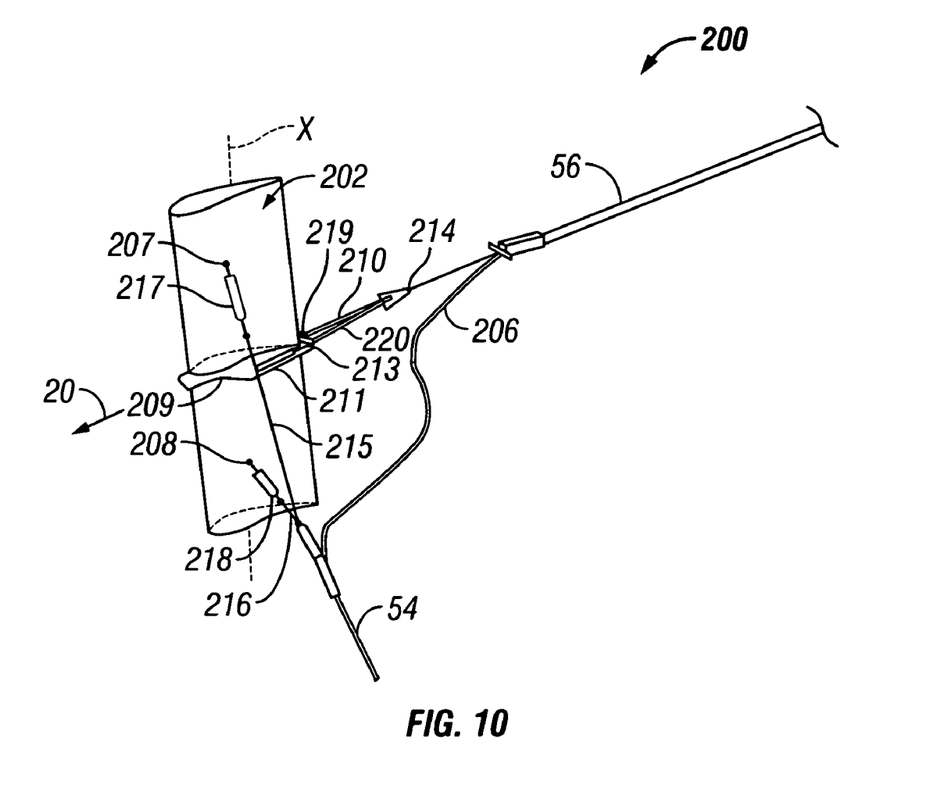
FIG. 10 is a perspective view of another embodiment of a deflector that provides adjustable depth as well as adjustable cross-line positioning.

FIG. 10 illustrates the construction of a deflector 200 that provides adjustable depth according to the invention, as well as adjustable cross-line positioning. The deflector body 202 that acts as a kind of otter board attached through the bridle members to the lead-in 54 that extends from the towing vessel (not shown) to the streamer 56, i.e. the equipment that is towed behind the vessel through the water. The three attachment points to the deflector are indicated at 207, 208 and 214. A streamer cable that performs the necessary communication with the tow is led along the lead-in 54 and the streamer 56 and extends therebetween as indicated by 206. It is separated from the lead-in 54 in the area of the deflector and reconnected with the streamer 56 some distance after the connecting point 214. This cable section 206 is slack, in order to prevent it from influencing or restricting the movements of the deflector 200.

The deflector 202 is also coupled to an adjustable bridle at two points 207,208 along a line generally parallel to the deflector's vertical axis, x. Here, an upper bridle segment 215 is coupled via an actuator 217 to the deflector body at point 207 and a lower bridle segment 216 is coupled via an actuator 218 to the deflector body at point 208. As describe previously, this arrangement allows the tilt angle of the deflector to be adjusted, resulting in control of the deflector depth.

At the rearward end of the deflector 202, the fitting 209 is equipped with an angle lever 210 that is rotatable or pivotable about a point 219 on the fitting. The attachment point 214 is located at the end of lever 210. The angle lever 210 is connected by its second leg 220 via a pivotable connection 213 with the side of the fitting 209. For adjusting purposes, there can be provided here an adjustable piston cylinder mechanism 211 that can cause a forward and backward movement of the pivotable connection 213 of leg 220 of lever 210. This adjusting mechanism can also be of a different shape to that of a piston cylinder, and the device can be capable of being operated by a motor drive, e.g. a hydraulic motor in the deflector, a battery-driven motor or it could be adjusted before being deployed. Additional description of the operation of such a deflector is found in U.S. Pat. No. 5,357,892, which patent is incorporated by reference herein.

The invention also includes a method of performing a marine seismic survey, the method including towing a plurality of laterally spaced seismic steamers over an area to be surveyed, wherein the depth of at least one of the streamers is controlled by a deflector device in accordance with any one of the preceding statements of the invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A system, comprising:
   a deflector body disposed inside a body of water characterized by a tilt angle relative to vertical, wherein the tilt angle controls a depth in which the deflector body is disposed inside the body of water;
   a bridle connected to a seismic cable, the bridle having a first upper segment secured to a first upper connection point on the deflector body and a first lower segment secured to a first lower connection point on the deflector body, wherein a length of the first upper segment and a length of the first lower segment is used to define a ratio, and wherein the first upper segment, the first lower segment and the deflector body form a geometry and the geometry is manipulated when the ratio is adjusted; and an actuator coupled to the bridle, wherein the actuator is configured to adjust the ratio of the length of the first upper segment to the length of the first lower segment to vary the tilt angle of the deflector body, thereby controlling the depth of the deflector body as the deflector body is being towed inside the body of water by the vessel.

2. The system of claim 1, wherein the actuator adjusts the length of the first upper segment of the bridle relative to the length of the first lower segment of the bridle.

3. The system of claim 1, wherein the first upper connection point and the first lower connection point each comprise at least one rotatable towpoint.

4. The system of claim 3, wherein the rotatable towpoints include lever arms, pulleys, or a combination thereof.

5. The system of claim 4, further comprising a further bridle segment extending between the rotatable towpoints.

6. The system of claim 5, wherein the further bridle segment is connected to the first upper segment and the first lower segment.

7. The system of claim 4, wherein the rotatable towpoints are pulleys, and wherein the bridle segments form a loop that extends around the pulleys.

8. The system of claim 5, wherein the actuator repositions the further bridle segment extending between the rotatable towpoints.

9. The system of claim 1, wherein the actuator repositions the first upper connection point, the first lower connection point, or a combination thereof.

10. The system of claim 1, wherein the deflector body is selected from a wing deflector and a deflector door.

11. The system of claim 1, wherein the deflector body includes a buoyancy element.

12. The system of claim 1, wherein the deflector body is part of a deflector that is slightly negatively buoyant.

13. The system of claim 1, further comprising a controller in communication with the actuator.

14. The system of claim 13, further comprising:
a sensor for measuring at least one parameter of the deflector and communicating the at least one parameter measurement to the controller, wherein the controller provides a command to the actuator to achieve at least one parameter setpoint.

15. The system of claim 14, wherein the at least one parameter is selected from depth of the deflector, motion of the deflector, orientation of the deflector, and combinations thereof.

16. The system of claim 14, wherein the controller is located within the deflector, the system further comprising a remotely located controller for providing the setpoint depth to the controller within the deflector.

17. The system of claim 14, wherein the controller is remotely located on the vessel.

18. The system of claim 1, wherein the seismic cable is a lead-in.

19. The system of claim 1, wherein the seismic cable is a streamer.

20. The system of claim 1, wherein the deflector is not suspended from a separate flotation device.

21. The system of claim 1, wherein the deflector is independent from a separate flotation device.

22. The system of claim 21, wherein an upper end of the deflector has more buoyancy than the lower end of the deflector.

23. The system of claim 1, wherein the deflector comprises:
a weight element mounted on the lower end of the deflector body; and
a buoyancy element mounted on the upper end of the deflector body.

24. The system of claim 13, wherein the controller causes the actuator to vary an angle between the deflector and the seismic cable so that the vertical component of lift from the deflector is substantially equal to the vertical component of gravity minus the vertical component of tension in the seismic cable.

25. The system of claim 1, wherein the deflector body has a streamlined configuration with a longitudinal axis extending generally downwardly in use.

26. The system of claim 25, wherein the first upper segment and the first lower segment of the bridle are connected to the deflector body on a line extending parallel to the longitudinal axis of the deflector body.

27. The system of claim 26, wherein the line is forward of the longitudinal axis.

28. The system of claim 26, wherein the first upper segment and the first lower segment have a length that is adjustable.

29. The system of claim 1, wherein the deflector body is selected from a wing deflector and a deflector door.

30. The system of claim 1, further comprising: a pivot float attached to the seismic cable forward of the deflector body.

31. The system of claim 30, wherein the pivot float serves as a pivot point from which the deflector pivots when the deflector depth is adjusted.

32. The system of claim 1, wherein the actuator adjusts the ratio using a load balancing principle.

33. A method for controlling a depth of a deflector under tow, comprising:
coupling a deflector to a bridle;
coupling the bridle to a towing cable;
coupling the towing cable to a vessel;
coupling a first segment of the bridle to a first upper rotatable towpoint on the deflector;
coupling a second segment of the bridle to a first lower rotatable towpoint on the deflector;
towing the deflector behind the vessel, thereby forming a tilt angle between the deflector and a vertical; and
adjusting the ratio of the length of the first segment to the length of the second segment to vary the tilt angle between the deflector and the vertical using the first upper rotatable towpoint and the first lower rotatable towpoint, thereby controlling the depth of the deflector inside a body of water as the deflector is being towed behind the vessel, wherein the first segment, the second segment and the deflector form a geometry and the geometry is manipulated when the ratio is adjusted.

34. The method of claim 33, further comprising: remotely controlling the tilt angle to change the depth.

35. The method of claim 33, further comprising:
measuring the depth of the deflector; and
providing a command for the deflector to achieve a different depth.

36. The method of claim 33, further comprising:
adjusting the first upper rotatable towpoint or the first lower rotatable towpoint or both with respect to the deflector body between the forward and rearward edges thereof.

37. The method of claim 33, further comprising:
coupling a float to the towing cable upstream of the deflector, wherein a change in the tilt angle causes the deflector to pivot about the float.

38. The method of claim 33, wherein the first upper connection point and the first lower connection point are rotatable towpoints comprising lever arms, pulleys, or a combination thereof.

39. The method of claim 38, further comprising: providing a further bridle segment extending between the upper and lower rotatable towpoints.

40. The method of claim 39, further comprising: rotating the rotatable towpoints to cause a change in the tilt angle of the deflector.

41. The method of claim 40, wherein the upper and lower rotatable towpoints are pulleys, and wherein the bridle segments form a loop that extends around the pulleys.

42. The method of claim 40, further comprising: repositioning the bridle segment extending between the at least two rotatable towpoints.

43. The method of claim 33, further comprising: repositioning the first upper connection point, the first lower connection point, or a combination thereof.

44. The method of claim 33, further comprising:
coupling a third segment of the bridle to a second upper rotatable towpoint, wherein the second upper rotatable towpoint is located at a horizontal distance away from the first upper rotatable towpoint;
coupling a fourth segment of the bridle to a second lower rotatable towpoint, wherein the second lower rotatable towpoint is located at the horizontal distance away from the first lower rotatable towpoint; and
controlling an angle of attack by adjusting the ratio of the lengths of the first and second segments to the lengths of the third and fourth segments, wherein the angle of attack controls a lateral position of the deflector.

45. The system of claim 1, wherein the actuator is a hydraulic cylinder coupled between the first upper segment and the first upper connection point such that the hydraulic cylinder shortens or lengthens the first upper segment.

46. The system of claim 1, wherein the actuator is a hydraulic cylinder coupled between the first lower segment and the first lower connection point such that the hydraulic cylinder shortens or lengthens the first lower segment.

47. The system of claim 46, further comprising a second actuator, wherein the second actuator is a second hydraulic cylinder coupled between the first lower segment and the first lower connection point such that the second hydraulic cylinder shortens or lengthens the first lower segment.

48. The system of claim 1, wherein the bridle is connected to the seismic cable via an inverted toothed wheel that is rotatably driven by the actuator such that the inverted toothed wheel controls the tilt angle.

49. The system of claim 1, further comprising a second actuator for varying an angle of attack of the deflector body, wherein the actuator and the second actuator are operated independently.

50. The system of claim 1, wherein the deflector body further comprises an upper controllable movable flap and a lower controllable movable flap.

51. The system of claim 50, wherein the actuator rotates the upper controllable movable flap and the lower controllable movable flap in opposite directions to control the tilt angle.

52. The system of claim 50, wherein the actuator rotates one of the controllable movable flaps to control the tilt angle.

53. The system of claim 1, wherein the bridle further comprises a frame having a first rigid segment, a second rigid segment, and a third rigid segment, wherein a first end of the first rigid segment is coupled to the first upper segment and a second end of the first rigid segment is coupled to the first lower segment, and wherein a first end of the second rigid segment and a first end of the third rigid segment are coupled to the seismic cable, and wherein a second end of the second rigid segment is coupled to the first end of the first rigid segment or the second end of the first rigid segment, and wherein a second end of the third rigid segment is coupled to a point on the first rigid segment.

54. The system of claim 53, wherein the first, second and third rigid segments are pivotally connected.

55. The system of claim 53, wherein the actuator is a hydraulic cylinder coupled to the second rigid segment, wherein the hydraulic cylinder applies a force on the second rigid segment such that the force causes a rotation of the first upper segment at the point thereby controlling the tilt angle.

56. The system of claim 1, wherein the bridle further comprises:
a second upper segment secured to a second upper connection point, wherein the second upper connection point is located at a horizontal distance away from the first upper connection point; and
a second lower segment secured to a second lower connection point, wherein the second lower connection point is located at the horizontal distance away from the first lower connection point.

57. The system of claim 56, wherein the actuator is configured to vary an angle of incidence by varying the lengths of the first upper segment, the second upper segment, the first lower segment, and the second lower segment, wherein the angle of incidence controls a lateral position of the deflector body.

* * * * *

UNITED STATES PATENT AND TRADEMARK OFFICE
CERTIFICATE OF CORRECTION

PATENT NO. : 7,658,161 B2 Page 1 of 1
APPLICATION NO. : 10/550703
DATED : February 9, 2010
INVENTOR(S) : Toennessen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 29 days.

Signed and Sealed this

Thirtieth Day of November, 2010

David J. Kappos
*Director of the United States Patent and Trademark Office*